United States Patent
Lutz

(10) Patent No.: US 11,644,807 B2
(45) Date of Patent: May 9, 2023

(54) CONTROL SYSTEM AND METHOD FOR TRACKING CHANGES IN CONFIGURATION DATA OF THE CONTROL SYSTEM IN A TECHNICAL PLANT

(71) Applicant: Siemens Aktiengesellschaft, Munich (DE)

(72) Inventor: Benjamin Lutz, Pfinztal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1 day.

(21) Appl. No.: 17/238,282

(22) Filed: Apr. 23, 2021

(65) Prior Publication Data
US 2021/0341893 A1 Nov. 4, 2021

(30) Foreign Application Priority Data
Apr. 30, 2020 (EP) ..................................... 20172499

(51) Int. Cl.
*G06F 19/00* (2018.01)
*G05B 19/048* (2006.01)

(52) U.S. Cl.
CPC .. *G05B 19/048* (2013.01); *G05B 2219/24015* (2013.01)

(58) Field of Classification Search
CPC ........ G05B 19/048; G05B 2219/24015; G05B 19/0428; G05B 19/41865; Y02P 90/02
See application file for complete search history.

(56) References Cited

U.S. PATENT DOCUMENTS

| 10,545,566 B2 * | 1/2020 | Benesch | G06F 1/3296 |
| 2003/0028269 A1 | 2/2003 | Spriggs et al. | |
| 2005/0027377 A1 * | 2/2005 | Lucas | G05B 19/4188 |
| | | | 700/83 |

(Continued)

FOREIGN PATENT DOCUMENTS

WO    0165322    9/2001

OTHER PUBLICATIONS

EP Search Report dated Oct. 22, 2020 based on EP20172499 filed Apr. 30, 2020.

(Continued)

*Primary Examiner* — Zhipeng Wang
(74) *Attorney, Agent, or Firm* — Cozen O'Connor

(57) ABSTRACT

A control system for a technical plant, in particular a manufacturing or process plant, which has at least one engineering station server for creating a configuration for components of the technical plant and at least one operator station server for operator control and process monitoring of the configured components of the technical plant, wherein the engineering station server is configured to provide, starting from an already created configuration, a change made by a configuration planner to the already created configuration with at least one change indicator that indicates the change made to the configuration, and to send the at least one change indicator in addition to the changed configuration to the operator station server in order to send information concerning the changes made to the configuration to an operator using the operator station server.

18 Claims, 4 Drawing Sheets

(56) References Cited

U.S. PATENT DOCUMENTS

| | | | | |
|---|---|---|---|---|
| 2009/0254678 A1* | 10/2009 | Gross | ............... | G05B 19/045 709/248 |
| 2011/0082569 A1* | 4/2011 | Bellville | ............ | G06F 16/22 700/79 |
| 2014/0343732 A1* | 11/2014 | Obermeier | ......... | G05B 15/02 700/275 |
| 2017/0123481 A1* | 5/2017 | Benesch | ........... | G06F 1/3296 |
| 2022/0100175 A1* | 3/2022 | Riju | ............... | G05B 19/4183 |

OTHER PUBLICATIONS

Siemens: "SIMATIC 7 Process Control System Preliminary edition 2017", pp. 1-3, 2017.
Siemens: "CFC for SIMATIC S7 V9.0 SP3 Mar. 2019", pp. 397-399, 2019.

* cited by examiner

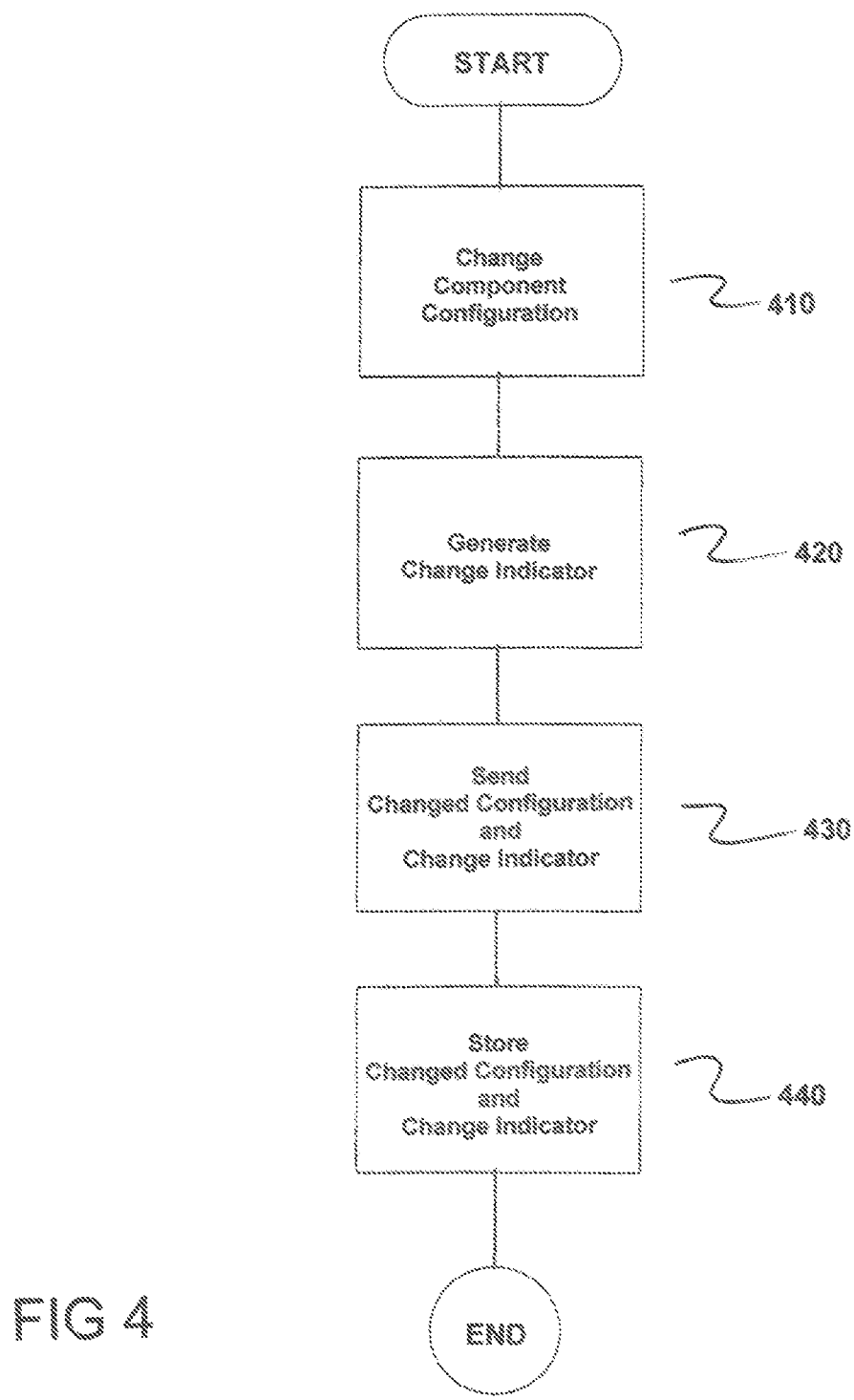

CONTROL SYSTEM AND METHOD FOR TRACKING CHANGES IN CONFIGURATION DATA OF THE CONTROL SYSTEM IN A TECHNICAL PLANT

BACKGROUND OF THE INVENTION

1. Field of the Invention

The invention relates to a control system for a technical plant, in particular a manufacturing or process plant, which has at least one engineering station server for creating a configuration for components of the technical plant and at least one operator station server for the operator control and process monitoring of the configured components of the technical plant, and to a method for transferring a changed configuration of components in a technical plant from an engineering station server of the technical plant to an operator station server of the technical plant.

2. Description of the Related Art

Over the service life of a processing plant the configuration of the plant and the "operator control and process monitoring" are continuously amended, improved and supplemented. For the most part, automation programs, plant mimic diagrams or process objects, are added, removed or modified for this in the processing plant during operation. For the transparency purposes, the various configuration releases are subject to version control and are archived for this during a configuration phase in an engineering station server.

The changes made to a plant are however also extremely important for the operators during the operator control and process monitoring. In the prior art, the operators are notified verbally, via handover logs, etc., about the changes made to the configuration. However, this practice is not very efficient and is prone to error. It is very laborious and complex for an operator of the technical plant to see which changes are connected to the latest loading procedure of the configuration and how these are to be dealt with.

SUMMARY OF THE INVENTION

It is an object of the invention to provide a control system for a technical plant and an associated method which enables changes made to the configuration of the technical plant to be displayed to an operator of the control system more simply and more efficiently.

This and other objects and advantages are achieved in accordance with the invention by a control system for a technical plant and method, wherein an engineering station server is configured to provide, starting from an already created configuration, a change made to the configuration by a configuration planner with a change indicator that indicates the change made to the configuration, and to send the change indicator to the operator station server in addition to the changed configuration in order to send information concerning the changes made to the configuration to an operator using the operator station server.

A control system in the present context means a computer-aided technical system comprising functionalities for representing, operating and controlling a technical system, such as a manufacturing or production plant. The control system can comprise sensors for determining measured values as well as various actuators. Furthermore, the control system can comprise what are known as process-related or manu- facturing-related components that serve to control the actuators or sensors. The term "control system" also covers further computing units for more complex rules and systems for data storage and processing.

The technical plant can be a plant from the process industry, such as a chemical, pharmaceutical, petrochemical plant, or a plant from the food and beverage industry. Also included here are all plants from the production industries, factories in which, for example, cars or goods of all types are produced. Technical plants that are suitable for the implementation of the inventive method can also come from the field of power generation. Wind turbines, solar plants or power plants for power generation are likewise covered by the term "technical plant".

An "operator station server" primarily means a server that centrally registers data of an operator control and process monitoring system and generally alarm and measured value archives of a (process) control system of a technical plant and makes it available to users. The operator station server generally establishes a communication link to automation systems of the technical plant and passes data of the technical plant to "clients" that serve for operator control and process monitoring of an operation of the individual functional elements of the technical plant.

The operator station server can have client functions in order to access the data (archives, messages, tags, variables) of other operator station servers. This means that images of an operation of the technical plant can be combined on the operator station server with variables of other operator station servers (server-server communication). The operator station server can be, without being restricted to this, a SIMATIC PCS 7 Industrial Workstation Server from the company SIEMENS.

An "engineering station server" primarily means a server that is configured to create, manage, archive and document various hardware and software projects for a (process) control system of a technical plant. Using special software design tools (engineering toolset) and ready-made modules and plans, the engineering station server can be used by a configuration planner of the technical plant to plan and manage an interaction of control devices and facilities of the technical plant. One example of this type of engineering station server is a SIMATIC manager server from the company SIEMENS.

An operator means a human operator of the technical plant or of the control system. The operator uses special user interfaces to interact with the technical plant or the control system and controls special technical functions of the plant. The operator can use an operator control and process monitoring system of the control system for this purpose.

A component can mean individual sensors or actuators of the technical plant. However, a component can also be a combination of multiple sensors and/or actuators, such as a motor, a reactor, a pump or a valve system.

In a manner known per se, the configuration planner can use the engineering station server of the inventive control system to parameterize, configure and/or program the components of the technical plant, where the term "configuration" is primarily being used for this. The configuration planner and the operator are generally two different people. However, this is not significant for the invention. The configuration planner and the operator can just as easily be one and the same person.

In accordance with the invention, changes that the configuration planner has made to the configuration in comparison to a reference status are provided with a change indicator. The change indicator points to the changes made to the configuration. It may advantageously include information about a type of change (e.g., a newly added sensor or simply a reengineered motor controller) and the components affected by the changes (e.g., sensor X and motor Y) of the technical plant.

The inventive control system has the substantial advantage that changes made to the configuration can be notified to the operator automatically. Compared to prior art systems and methods, information does not have to be (manually) exchanged in a manner that is laborious and prone to error between the configuration planner and the operator. Instead, the operator automatically receives (illustrative) information about which plant mimic diagram has changed or which process object has been newly added to the configuration, and the like.

The change indicator preferably contains comments by the configuration planner concerning the changes made to the configuration. The comments enable the operator to understand the changes made even more readily. A comment could, for example, read: "A fill-level animation as a function of a process object Z added to plant mimic diagram".

Particularly preferably, the operator station server is configured to visually present to the operator the information included in the received change indicator so as to enable the operator to quickly register the changes made by the configuration planner to the configuration of the components of the technical plant. To this end, the operator station server can send information to the operator station client which the operator is currently controlling and monitoring. The information contained in the change indicator can be presented to the operator for example in the form of highlighting in terms of color and/or shape, to enable the attention of the operator to be drawn specifically to the changes made to the configuration.

In connection with a particularly advantageous embodiment of the invention, the operator station server is configured to visually present to the operator the information in the change indicator received only for those components of the technical plant for which the operator has access rights. In other words, the information presented to the operator is individualized. In this way, the set of change indicators visually presented to the operator can be efficiently restricted, so as not to overload the operator with unnecessary information. It is also possible to visually present the information in a change indicator to the operator until the operator has taken note of the change indicator.

The change indicator sent from the engineering station server to the operator station server is preferably stored in the operator station server, such that the operator also has access to the stored change indicator via a further operator station server. By storing the change indicator in this way it is kept, regardless of the operator station server on which the operator is logged in via an operator station client, until the operator has confirmed having taken note of the changes made. Thus, it possibly to easily ensure the individual operator does not fail to take note of any changes that are important for the performance of said operator's work. The operator can then also be visually presented with a list or suchlike containing the changes made by the configuration planner, which among other things shows the operator which changes said operator has not yet taken note of.

It is also an object of the invention to provide a method for sending a changed configuration of components of a technical plant from an engineering station server of the technical plant to an operator station server of the technical plant. The method comprises a) changing the configuration of the components of the technical plant by a configuration planner on the engineering station server, b) generating a change indicator identifying the changes made to the configuration of the components, c) sending the changed configuration and the change indicator to the operator station server, and d) storing the changed configuration and the change indicator in the operator station server, such that the change indicator can be retrieved by an operator of the operator station server.

With respect to the comments about the method claim and the associated advantages, reference is made to the above explanations about the control system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages of this invention described above and the way in which they are achieved will become clearer and more transparent in connection with the following description of the exemplary embodiment, which is explained in greater detail in connection with the drawings, in which:

FIG. 4 Is a flowchart of the method in accordance with the invention.

DETAILED DESCRIPTION OF THE EXEMPLARY EMBODIMENTS

Figure 1:
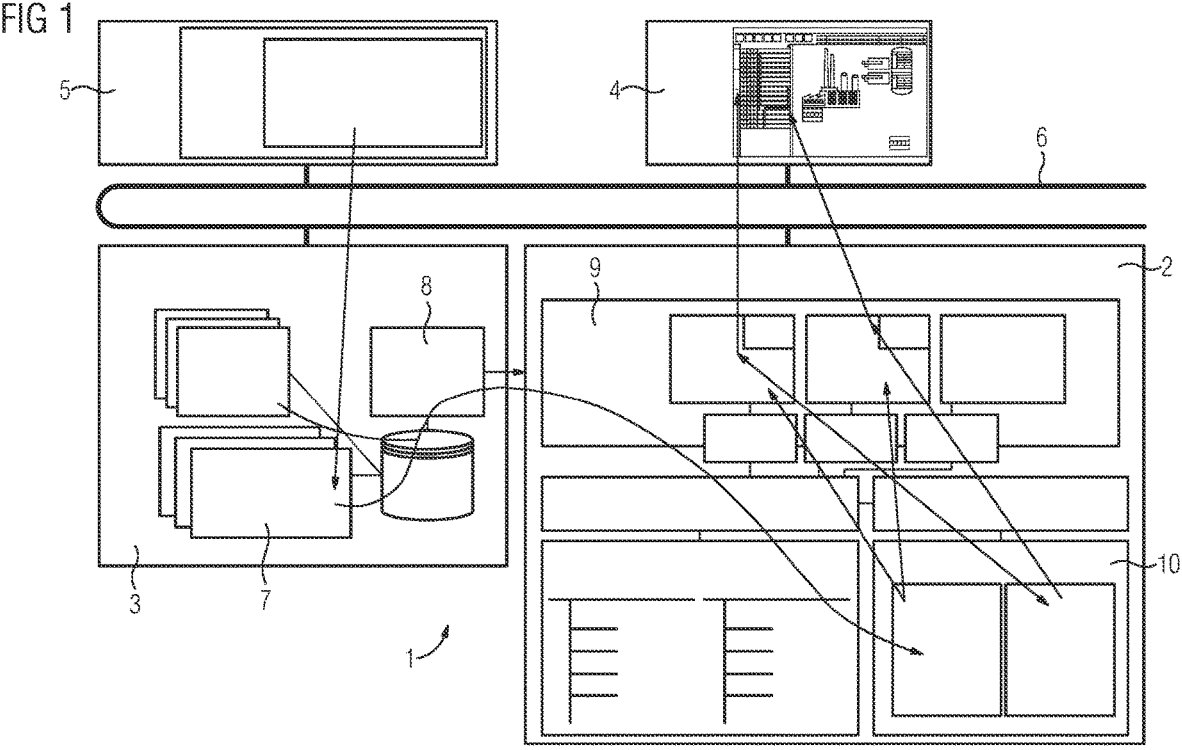
FIG. 1 is a schematic illustration of a control system of a technical plant in accordance with the invention.

FIG. 1 shows part of an inventive control system 1 of a technical plant configured as a processing plant. The control system 1 comprises an operator station server 2, an engineering station server 3, an operator station client 4 and an engineering station client 5. The operator station server 2, the engineering station server 3, the operator station client 4 and the engineering station client 5 are connected to one another via a terminal bus 6 and to other components (not shown) of the control system 1 such as a process data archive. The terminal bus 6 can, without being restricted thereto, be configured, for example, as Industrial Ethernet.

A user or configuration planner of the processing plant has access to the engineering station server 3 via the engineering station client 5 in the context of a configuration (engineering). The configuration planner can undertake a configuration of the processing plant via a special engineering tool 7 implemented on the engineering station server 3. Here, the configuration planner parameterizes, programs or configures individual components of the technical plant, such as sensors, actuators, motors and/or valves.

The actual configuration is automatically sent together with a change indicator by a transfer service 8 of the engineering station server 3 to a visualization service 9 of the operator station server 2. The change indicator created contains/the change indicators created contain information about the type of changes made to the configuration and which components of the processing plant are affected by the changes. A separate change indicator can be created for each component of the processing plant, the configuration of which has been changed. It is however also possible to provide a "collective" change indicator for a combination of multiple components.

Also included in the change indicator(s) in this case are comments by the configuration planner explaining in detail to the operator the changes made to the configuration. The reference of the change indicator is the last loading procedure into the operator station server 2—this establishes what has changed since the last loading procedure.

The visualization service 9 stores the information in the change indicator that is received in a user database 10 of the operator station server 2. Stored in the user database 10 generally are user profiles and personal settings of operators/controllers of the processing plant. If the operator logs on via the operator station client 4 for the operator control and process monitoring, different software components such as a technological hierarchy (EQH) or an image hierarchy, displayed on the operator station client 4 via the visualization service 9, can access the user database 10 to graphically highlight (for example, using a colored border) new or changed plant mimic diagrams in the image hierarchy during the runtime of the processing plant, for example.

The control system 1 in this case has an individual access rights administration for the individual components of the processing plant. A change indicator is thus displayed to the respective operator only for the components for which the operator actually possesses access rights. For the purpose of tracking changes, the set of changes relevant for the respective operator is stored in retrievable form in the part of the user database 10 assigned to the operator. If, for example, the operator opens a plant mimic diagram provided with a change marking, the change marking for this plant mimic diagram is deleted from the set of changes in the user database 10. The operator thus has the possibility after a loading procedure to observe the components of the processing plant affected by a change during the runtime and to retrieve the context for this. The change identifier is stored in an individual user database 10. Consequently, the change identifier is kept, regardless of the operator station server 2 on which the operator is logged in via an operator station client 4, until the operator has confirmed having taken note of the change indicator for all components. It is thereby possible to ensure the individual operator has not failed to take note of any changes that are important for the performance of said operator's work.

The exemplary embodiment explained below based on FIG. 2 and FIG. 3 serves to make clearer the individualized change tracking of configuration data during the runtime for more transparent and more efficient operator control and process monitoring.

Figure 2:
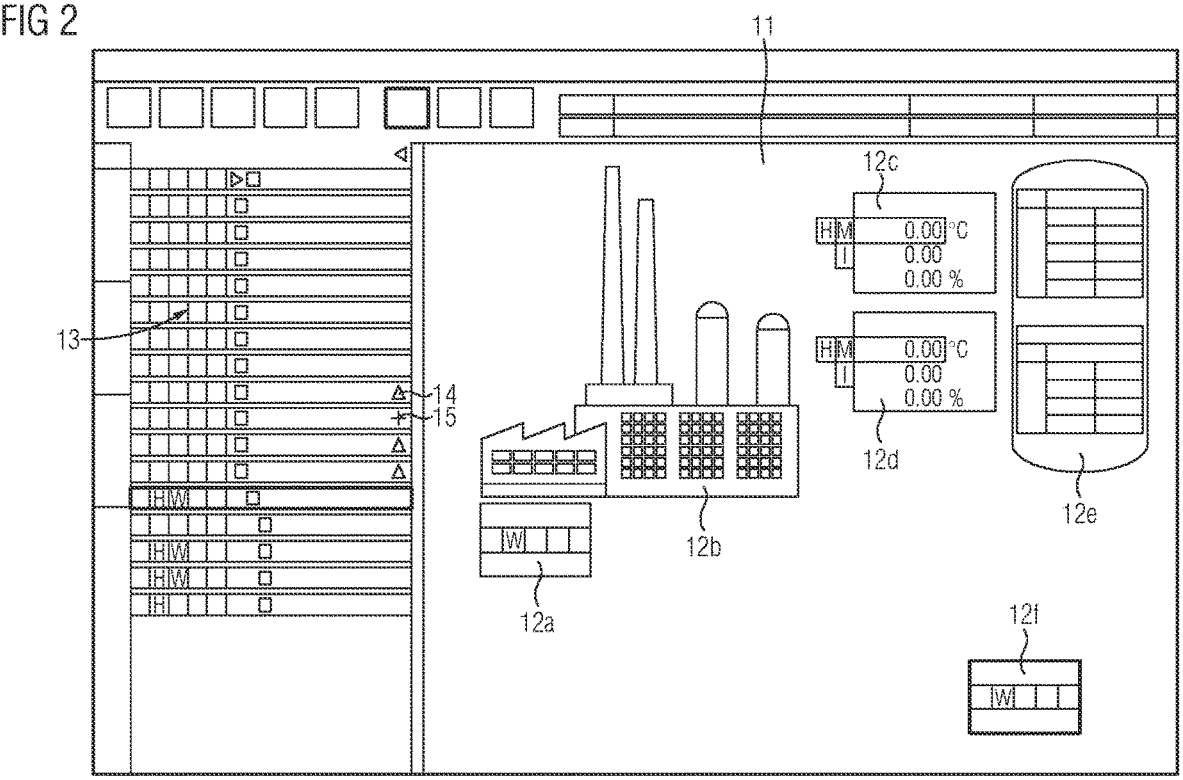
FIG. 2 is a schematic illustration of a plant mimic diagram of the control system of FIG. 1.
Figure 3:
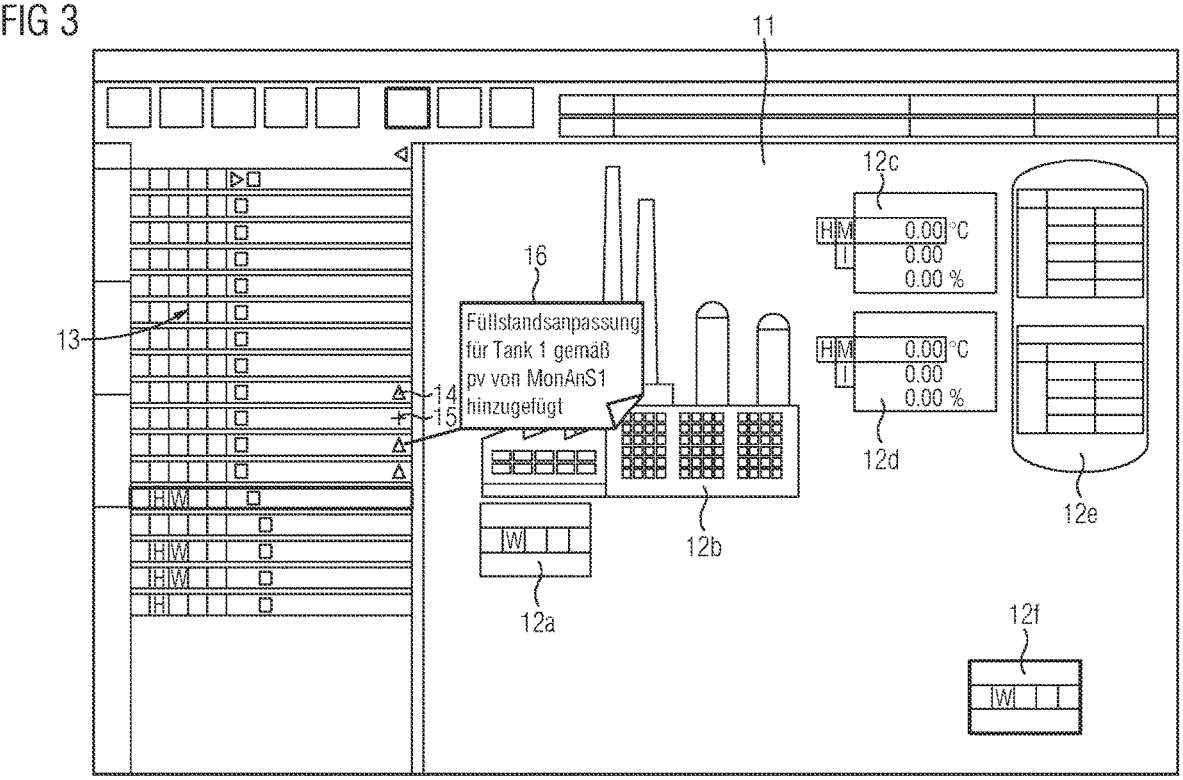
FIG. 3 is a schematic illustration of a plant mimic diagram of the control system of in accordance with an embodiment of the invention.

FIG. 2 shows a plant mimic diagram 11 of the processing plant. The plant mimic diagram 11 comprises representations of process objects 12*a*, 12*b*, 12*c*, 12*d*, 12*e*, 12*f*, which are assigned to individual (real) components of the processing plant or represent them digitally. The configuration of one of the process objects 12*f* or its associated component has changed in the present example compared to the last loading procedure of the configuration from the engineering station server 3 to the operator station server 2. The operator is made aware of this change by a colored border of the process object 12*f* (symbolized in FIG. 2 by a thicker frame).

Shown on the left-hand side in FIG. 2 is a hierarchically structured sequence 13 of individual plant mimic diagrams 11. Here, a first change indicator 14 (a triangle symbol) points to a plant mimic diagram 11 that has changed compared to the last status. A second change indicator 15 (a cross symbol) indicates that the plant mimic diagram 11 is completely new.

If the operator now wishes to find out in greater detail what the respective changes relate to, it is possible to retrieve additional comments 16 by selecting the corresponding change indicator 14, 15 (triangle or cross). A comment 16 such as this can be recognized in FIG. 3. If the operator has opened a plant mimic diagram 11 provided with a change indicator 14, 15, then the change indicator 14, 15 is no longer displayed by the operator station client 4. The operator can thus see which changes the operator has not yet taken note of.

FIG. 4 is a flowchart of the method for sending a changed configuration of components of a technical plant from an engineering station server 3 of the technical plant to an operator station server 2 of the technical plant. The method comprises changing the configuration of the components of the technical plant by a configuration planner located on the engineering station server 3, as indicated in step 410.

Next, at least one change indicator 14, 15 identifying the changes made to the configuration of the components is generated, as indicated in step 420.

Next, the changed configuration and the at least one change indicator 14, 15 are sent to the operator station server 2, as indicated in step 430.

Next, the changed configuration and the at least one change indicator 14, 15 are stored in the operator station server 2, such that the change indicator 14, 15 is retrievable by an operator of the operator station server 2, as indicated in step 440.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for a technical plant comprising:
at least one engineering station server for creating a configuration for components of the technical plant; and
at least one operator station server for operator control and process monitoring of configured components of the technical plant;
wherein the engineering station server is configured to provide, starting from an already created configuration, a change made by a configuration planner to the already created configuration with at least one visually displayed change indicator which indicates the change made to the configuration, and to send the at least one visually displayed change indicator in addition to the changed configuration to the operator station server in order to send information concerning the changes made to the configuration to an operator using the operator station server, the at least one visually displayed change indicator being selectable by the operator.

2. The control system as claimed in claim 1, wherein the visually displayed change indicator comprises information about a type of change and components of the technical plant affected by the change.

3. The control system as claimed in claim 1, wherein the visually displayed change indicator comprises comments by the configuration planner concerning the changes made to the configuration.

4. The control system as claimed in claim 2, wherein the visually displayed change indicator comprises comments by the configuration planner concerning the changes made to the configuration.

5. The control system as claimed in claim 1, wherein the operator station server is configured to visually present to the operator the information included in the received visually displayed change indicator, to enable the operator to quickly register the changes made by the configuration planner to the configuration of the components of the technical plant.

6. The control system as claimed in claim 5, wherein the operator station server is configured to visually display to the operator the information in the received visually displayed change indicator only for those components of the technical plant for which the operator has access rights.

7. The control system as claimed in claim 1, wherein the visually displayed change indicator received from the engineering station server is stored in the operator station server, such that the operator additionally has access to the stored visually displayed change indicator via a further operator station server.

8. The control system as claimed in claim 1, wherein the technical plant comprises a manufacturing or process plant.

9. A method for sending a changed configuration of components of a technical plant from an engineering station server of the technical plant to an operator station server of the technical plant, the method comprising:
   a) changing the configuration of the components of the technical plant by a configuration planner located on the engineering station server;
   b) generating at least one visually displayed change indicator identifying the changes made to the configuration of the components;
   c) sending the changed configuration and the at least one visually displayed change indicator to the operator station server; and
   d) storing the changed configuration and the at least one change indicator in the operator station server, such that the visually displayed change indicator is retrievable by an operator of the operator station server, the visually displayed change indicator being selectable by the operator.

10. The method as claimed in claim 9, wherein the operator station server visually presents to the operator the information concerning the changed components included in the visually displayed change indicator.

11. The method as claimed in claim 9, wherein the visually displayed change indicator (comprises information about the type of change and the components of the technical plant affected by the change.

12. The method as claimed in claim 10, wherein the visually displayed change indicator comprises information about the type of change and the components of the technical plant affected by the change.

13. The method as claimed in claim 9, wherein the visually displayed change indicator includes comments by the configuration planner about the changes made to the configuration.

14. The method as claimed in claim 10, wherein the visually displayed change indicator includes comments by the configuration planner about the changes made to the configuration.

15. The method as claimed in claim 11, wherein the visually displayed change indicator includes comments by the configuration planner about the changes made to the configuration.

16. The method as claimed in claim 9, wherein the operator station server visually presents to the operator the information included in the visually displayed change indicator received, to enable the operator to quickly register the changes made by the configuration planner to the configuration of the components of the technical plant.

17. The method as claimed in claim 16, wherein the operator station server visually displays to the operator the information in the received visually displayed change indicator only for those components of the technical plant for which the operator has access rights.

18. The method as claimed in claim 9, wherein the visually displayed change indicator sent from the engineering station server to the operator station server is stored in the operator station server, such that the operator additionally has access to the stored visually displayed change indicator via a further operator station server.

* * * * *